E. F. WACKWITZ.
LIGHTING SYSTEM.
APPLICATION FILED NOV. 17, 1911.

1,031,101.

Patented July 2, 1912.

Witnesses.
E. B. Gilchrist.
H. R. Sullivan.

Inventor.
Ernest F. Wackwitz
by Thurston & Kwis
Attys.

UNITED STATES PATENT OFFICE.

ERNEST F. WACKWITZ, OF CLEVELAND, OHIO, ASSIGNOR TO THE PEERLESS MOTOR CAR COMPANY, OF CLEVELAND, OHIO, A CORPORATION OF OHIO.

LIGHTING SYSTEM.

1,031,101.   Specification of Letters Patent.   Patented July 2, 1912.

Application filed November 17, 1911. Serial No. 660,744.

*To all whom it may concern:*

Be it known that I, ERNEST F. WACK- WITZ, a citizen of the United States, residing at Cleveland, in the county of Cuyahoga and State of Ohio, have invented a certain new and useful Improvement in Lighting Systems, of which the following is a full, clear, and exact description.

This invention relates to a lighting system adapted especially for automobile use, although not necessarily confined to automobile lighting.

In an automobile provided with a full equipment of lamps, it is desirable that the lamps be lighted in sets of various combinations, or that they all be lighted at the same time. For example, it may be desirable to light the head and tail lamps, the side and tail lamps, or the head, side and tail lamps. In case the automobile is equipped also with a speedometer lamp, it may be desirable to light this lamp at the same time the other lamps are in use.

It is preferable for numerous reasons that low voltage lamps be employed for automobile lighting service, and in the event that low voltage lamps are employed, the head and side lamps might be connected in pairs in series relation to the source of current. But as the series arrangement has the disadvantage that when one lamp is burned out, the companion lamp is put out of service, it is customary to connect the different lamps separately in parallel to the source of current. This, however, requires the use of comparatively high voltage lamps, which are less desirable than low voltage lamps, as before stated.

It is the object of the present invention to provide a lighting system by which the lamps may be connected to the source of current in various sets or combinations, with certain of the lamps, such as the head or side lamps connected in series, but without any liability of both lamps of a set being put out of service when one is burned out or destroyed.

The above object is accomplished by my invention which may be briefly summarized as consisting in certain novel combinations and arrangements of parts which will be described in the specification and set forth in the claims.

Figure 1:
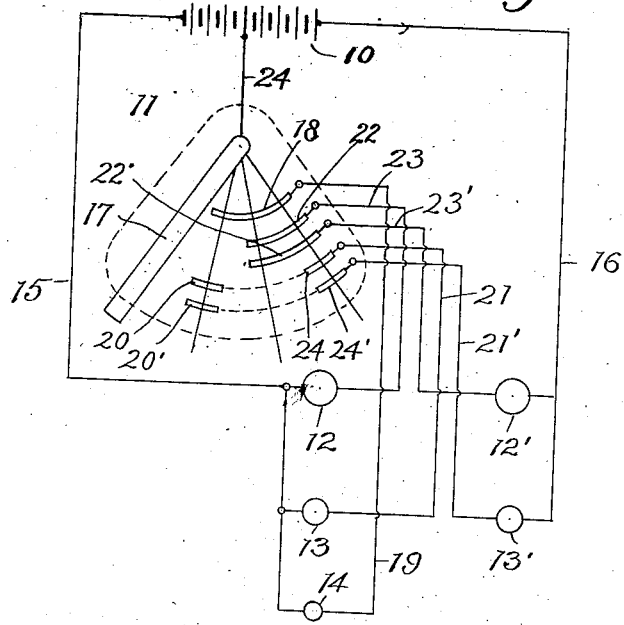
Figure 2:
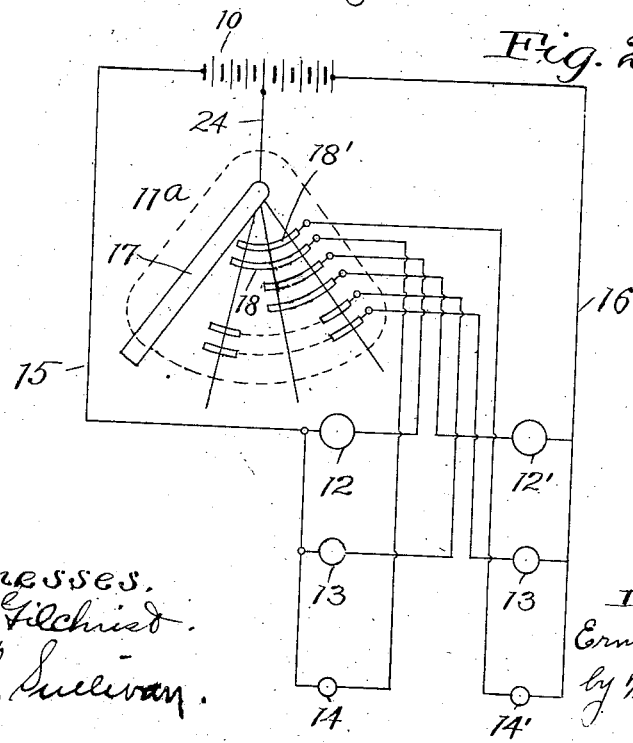

In the drawings, Figure 1 is a diagrammatic illustration of an automobile lighting system arranged in accordance with my invention; Fig. 2 is a similar system showing a slight modification.

Referring now to Fig. 1, it will be seen that the system includes a source of current 10, which is here shown as a battery, preferably a storage battery, a switch 11, and five lamps including two head lamps 12 and 12', two side lamps 13 and 13', and a tail lamp 14. It will be seen also that the left head light 12, left side light 13, and the tail lamp 14, each have one side connected to a conductor 15, leading to one main or end terminal of the battery, and that the right head light 12' and the right side lamp 13' each have one side connected to a conductor 16, leading to the opposite main or end terminal of the battery. These connections are in this case permanent connections.

In order that the two head lamps and the tail lamp, and the two side lamps and the tail lamp, or all the lamps may be connected to the source of current with the head lamps and the tail lamps in series, so that there may be employed low voltage lamps rated at say—one half the voltage of the battery, I employ a specially arranged and specially connected switch 11 having a movable switch member 17 which is adapted to be placed in off position, as shown in the drawing, to cut all the lamps out of circuit, or to be placed in any one of three operative positions to connect in any group or set of lamps above stated, or all the lamps. This switch 11 includes in addition to the movable switch member or contact 17, a contact 18 which is engaged by the movable member 17 in all three of its operative positions, this contact being connected by a conductor 19 to the side of the tail lamp 14, opposite to the side having the connection with the battery. The switch also includes two contacts 20 and 20' which are adapted to be bridged by the switch member 17 when the latter is in its first operative position, and are connected respectively by conductors 21 and 21' to the side lamps 13 and 13'; two contacts 22 and 22' which are bridged by a movable switch member when the latter is in its second operative position, and are connected respectively by conductors 23 and 23' to terminals of the lamps 12 and 12'; and two contacts 24 and 24' which are connected respectively by the conductors 21 and 21' to the side lamps 13 and 13'. Thus, when the switch is in its first operative position, by the bridging of the contacts 20 and 20', the side lamps 13 and 13' are connected together in series across the terminals of the battery; when the switch is in its second operative position by the bridging of contacts 22 and 22', the two head lamps are connected in series across the terminals of the battery; and when the switch is in its third operative position, the head lamps and the side lamps are connected in series parallel arrangement to the terminals of the battery.

In order that the tail lamp will always be lighted when the movable switch member is in any of its operative positions, and in order that any one of the two sets of series connected lamps may be effective if its companion lamp is burned out, I connect the movable switch member 17 by a conductor 24 to a tap or terminal of the battery intermediate the main or end terminals. This connection is brought about by the conductor 24; and does not affect the series relation of the head or side lamps, nor the flow of current therethrough, for during normal conditions, this conductor 24 simply carries only that current which is required by the tail lamp, the current for either the head or tail lamps passing through the lamps, from one main terminal of the battery to the other, and the current for the tail lamp being supplied by one half of the battery, or that portion between the middle terminal and one of the end terminals. However, in case one of the head lamps, or one of the side lamps is destroyed, this conductor 24, extending between the switch and the middle terminal of the battery will carry the current for the other lamp which was previously connected in series with the one destroyed.

In Fig. 2, I have shown a system very similar to that first described, but in this case I employ an additional lamp 14' which has one terminal connected to the conductor 16 leading to one of the main terminals of the battery, and has its other terminal connected to an additional contact 18' of the switch, here designated 11ᵃ. This system is otherwise the same as the system first described, and the parts which are otherwise unchanged and are a duplicate of those shown in Fig. 1,—are given the same reference characters as in Fig. 1. This additional lamp 14' may be the speedometer lamp and will in the present case be lighted the same as the tail lamp 14 in all operative positions of the movable switch member 17. The contact 18' to which one terminal of the lamp 14' is arranged adjacent the contact 18, is electrically connected to the latter in all operative positions of the movable switch member. In this system, the speedometer lamp 14' balances the tail lamp 14 and these two lamps will therefore be connected in series across the main terminals of the battery. Consequently, there will be a uniform withdrawal of current between one main terminal of the battery to the other main terminal, and the connection 24, between the switch and the middle terminal of the battery carries no current, except when one of the series connected lamps of any set is burned out, in which case it will, as in the first instance, carry the current required by the companion lamp.

While I have shown one particular form of switch, I do not wish to be confined to the same, for it is obvious that a switch of any other suitable type or construction, such as a drum type, may be employed if desired.

Having thus described my invention, what I claim is:—

1. In a lighting system, a source of current, a plurality of lamps, a switch comprising movable and stationary members, the lamps, switch, and source having connections by which the switch when its movable member is in different operative positions, connects various combinations of the lamps to the source, with part of the lamps in series relation, and at the same time establishes an electrical connection from a point between each pair of series connected lamps to substantially the middle point of the source.

2. In a lighting system, a source of current, a plurality of lamps adapted to be connected in groups to the source, a switch having movable and stationary members, and serving to complete the circuit through the different groups of lamps with lamps of each group connected in series relation, the movable member of the switch being electrically connected to a terminal of the source between the main terminals to which the lamps are connected.

3. In a lighting system, a source of current, a plurality of lamps adapted to be connected in groups to the source of current and having terminals connected to main terminals of the source, a switch having movable and stationary members, and serving to connect lamps of the different groups in series relation to the source, the movable member of the switch being connected to an auxiliary terminal between the main terminals to which the lamps are connected.

4. In a lighting system, a source of current, a plurality of lamps and a switch having movable and stationary members and serving to connect to the source different sets of lamps in series relation or all the lamps in series parallel relation, the lamps having permanent connections with main terminals of the source and the switch having its movable member connected to an auxiliary terminal between the main terminals.

In testimony whereof, I hereunto affix my signature in the presence of two witnesses.

ERNEST F. WACKWITZ.

Witnesses:
H. R. SULLIVAN,
A. F. KWIS.